United States Patent Office

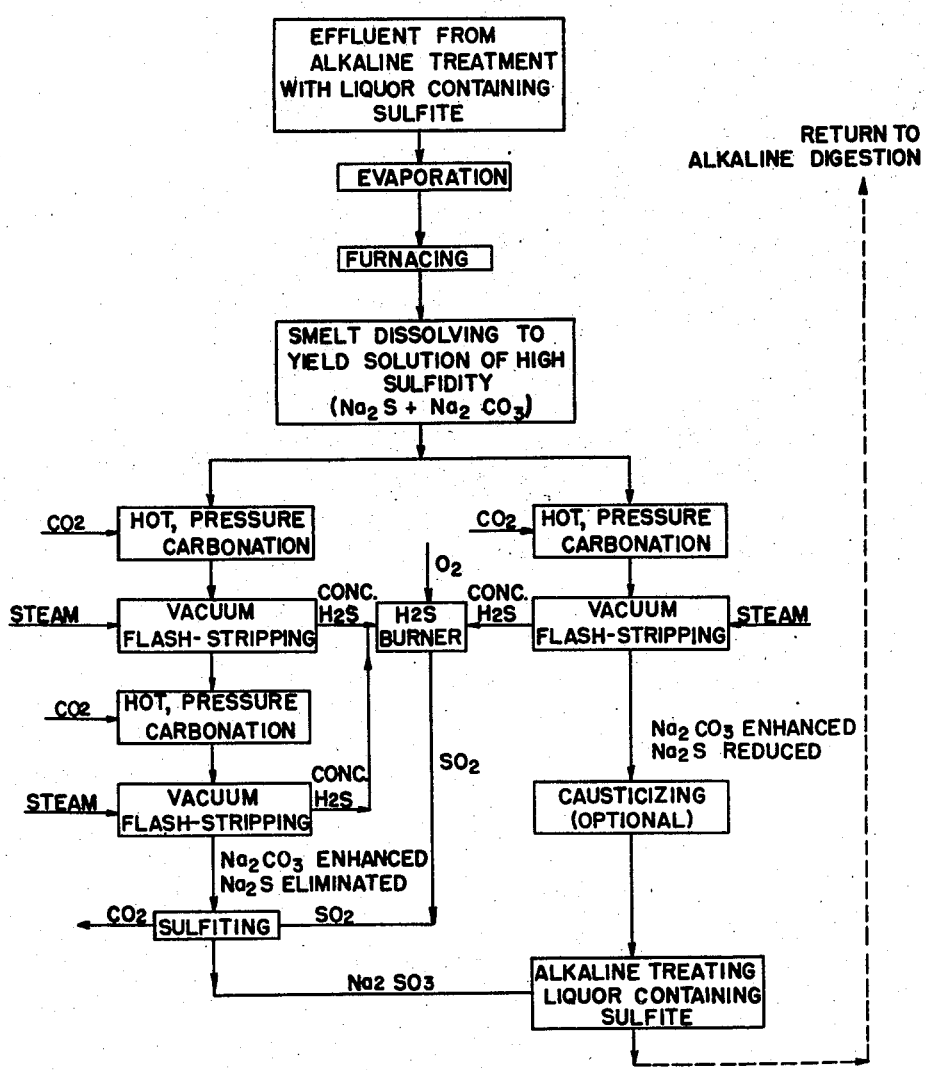
FIG. I

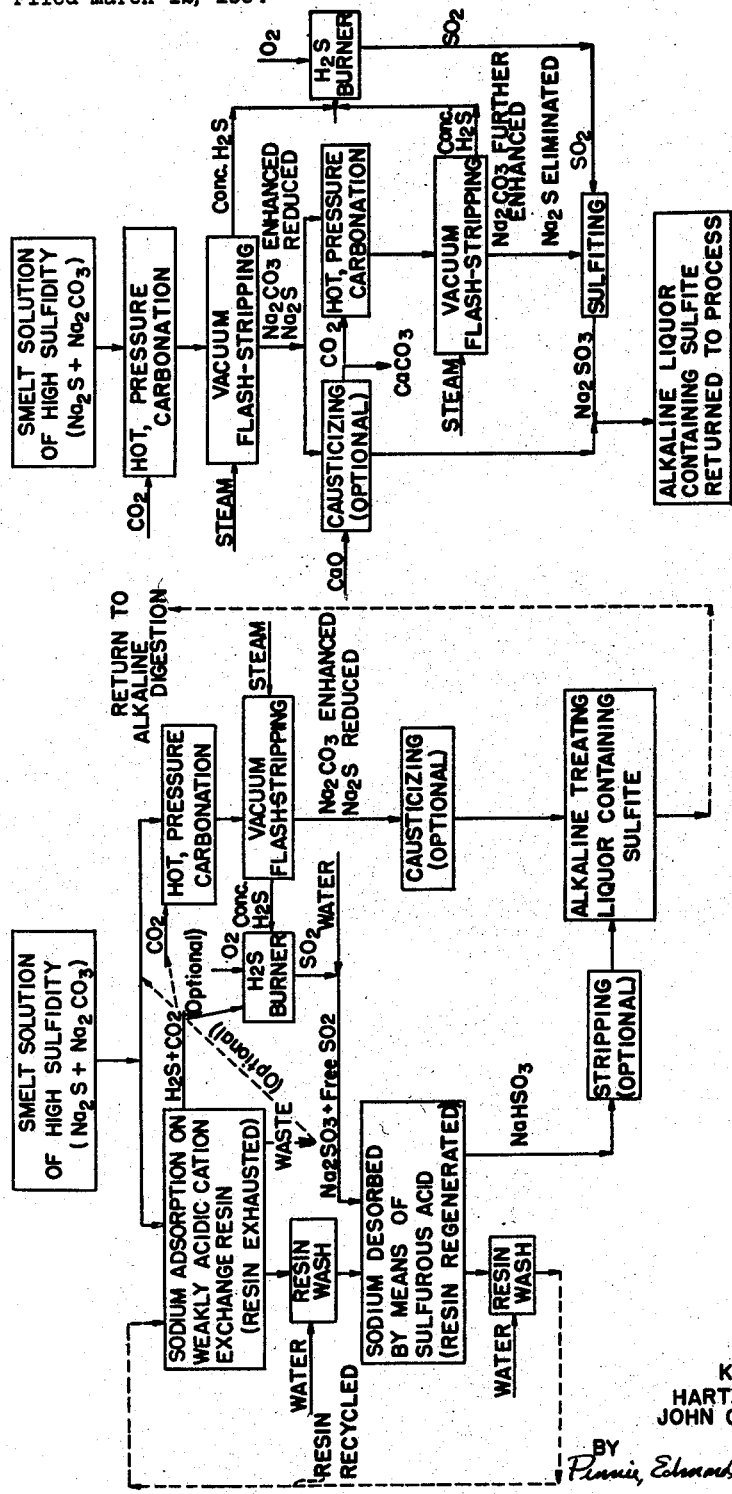

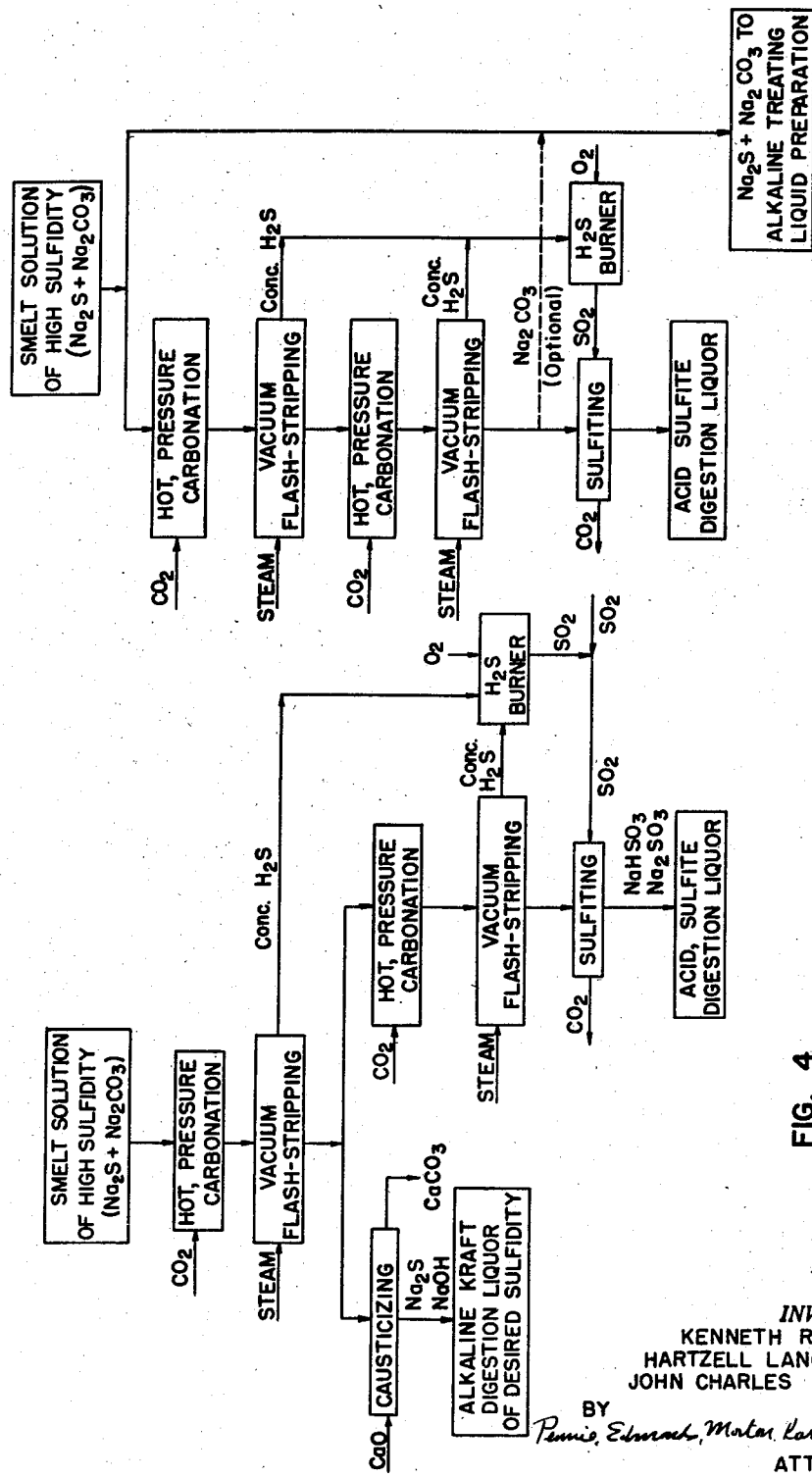

2,841,561
Patented July 1, 1958

2,841,561

RECOVERY OF CHEMICALS FROM SMELT SOLUTIONS

Kenneth Russell Gray, Hartzell Lance Crosby, and John Charles Steinberg, Shelton, Wash., assignors to Rayonier Incorporated, Shelton, Wash., a corporation of Delaware Application March 12, 1954, Serial No. 415,754

7 Claims. (Cl. 252—183)

This invention relates to the production of wood pulp and the recovery of chemicals used therein, and has for its object the provision of an improved process for the treatment of smelt solutions containing sodium sulfide. This application is a continuation-in-part of our application Serial No. 166,683, filed June 7, 1950, now abandoned.

While our process is generally applicable to the treatment of smelt solutions from the digestion of wood with alkaline liquor containing sodium sulfide, it is also advantageously applicable to the treatment of smelt solutions from two-stage pulping processes wherein wood is digested successively with acid and alkaline digestion liquor, and the regeneration of either acid or alkaline digestion liquor, or both. The invention is applicable to the regeneration of pulping digestion liquors for use in pulping processes where an alkaline digestion follows a sulfurous acid, acid sulfite, hydrogen sulfide, or hydrosulfide digestion.

Our United States Letters Patent No. 2,675,297, is concerned with the treatment of salt solutions containing sodium sulfide, and our application Serial No. 415,817, filed March 21, 1954, is concerned with the treatment of smelt solutions containing sodium sulfide, both applications describing and claiming the carbonation of the hot solution with carbon dioxide under pressure followed by steam stripping under a vacuum to release hydrogen sulfide in concentrated form.

In accordance with one aspect of our invention, we subject the smelt solution to carbonation and flash-stripping to effect at least a partial elimination of the sulfide, and subject a part of the effluent smelt solution from the carbonation and flash-stripping to further carbonation and flash-stripping to substantially eliminate the sodium sulfide and enhance the sodium carbonate content and then we may subject the resulting liquor to sulfiting with sulfur dioxide to form sodium sulfite. In one modification, the other part of the effluent smelt solution is subjected to causticization to form alkaline kraft digestion liquor containing sodium sulfide and sodium hydroxide.

In another aspect of our invention one part of the smelt solution is removed for use as alkaline digestion liquor, and the other part is subjected to multiple stages of carbonation and flash-stripping for the enhancement of the sodium carbonate content and the substantial elimination of sodium sulfide, resulting in the production of concentrated hydrogen sulfide which is oxidized to sulfur dioxide and reacted with the liquor enhanced in sodium carbonate to form acid sulfite digestion liquor.

In one aspect of our invention we subject one part of the smelt solution to carbonation followed by flash-stripping to remove hydrogen sulfide, and subject another part of the smelt solution to treatment with an ion exchange resin to adsorb sodium and release hydrogen sulfide and carbon dioxide. The ion exchange resin containing adsorbed sodium may be treated with sulfur dioxide to form sodium bisulfite, the sulfur dioxide being advantageously obtained by oxidation of the hydrogen sulfide either from the flash-stripping or from the ion exchange treatment, or both. In this aspect of our invention the effluent from the ion exchange treatment which has been depleted in sodium is preferably combined with the solution undergoing carbonation and flash-stripping whereby carbonation is effected with a smaller amount of carbon dioxide because of the lower alkalinity of the solution.

In still another aspect of our invention, one part of the smelt solution is subjected to carbonation and flash-stripping to remove hydrogen sulfide to reduce the content of sodium sulfide and enhance the content of sodium carbonate, and another part of the smelt solution is subjected to a plurality of carbonation and flash-stripping operations to substantially eliminate the sodium sulfide and also enhance the sodium carbonate. The sodium sulfide free solution can be treated with sulfur dioxide or sulfurous acid, preferably obtained from the process as herein described, to form sodium sulfite or sodium bisulfite. When sodium sulfite is formed the resulting solution is combined with the effluent solution of the first-mentioned carbonation and flash-stripping to form alkaline treating liquor containing sodium sulfite.

The carbonation and flash-stripping operations of our invention are carried out as an all solution process, as will be described more fully hereinafter.

When wood is digested with sulfurous acid, acid sulfite, hydrogen sulfide, or hydrosulfide preceding an alkaline digestion, sulfur is introduced into the alkaline waste liquor through carryover in the chips and associated liquor or through the intentional combination of the waste liquors to facilitate evaporation and combustion. This sulfur will appear in the smelt as sulfide and can result in a regenerated alkaline liquor with a higher sulfide content than desired, as well as result in failure to recover chemicals suitable for the acid digestion. Also, when sodium sulfite is employed as a constituent of the alkaline digestion liquor itself, the resulting smelt cannot be simply causticized for re-use as the digestion liquor, since such smelt will contain a high sulfide content and very little sulfite.

Our invention provides a practical solution phase process for converting a smelt containing sodium sulfide into forms suitable for the preparation of both alkaline and acid digestion liquors in a two-stage pulping process employing an acid digestion with sulfurous acid, acid sulfite, hydrogen sulfide or hydrosulfide followed by alkaline digestion. The invention also provides a solution phase process for treating the sodium sulfide smelt from the combustion of waste liquor from wood digestion processes using alkaline digestion liquors containing sodium sulfite.

We have discovered that the waste acid and alkaline effluents from a two-stage pulping process may be combined for evaporation and burned in a common furnace and that both acid and alkaline digestion liquors may be regenerated from the single smelt obtained. Further, there are marked technical and economical advantages in so doing over combustion of the sulfite waste liquor separately. Since a single evaporator and furnace installation is required, control and operation are greatly simplified. The excess soda normally present in the waste alkaline digestion liquor will result in (1) partial neutralization of the acid liquor, thereby reducing evaporatory corrosion, (2) increased sulfur recovery will be achieved through retention of the sulfur in the smelt, and (3) a reduction of the melting point of the resulting smelt through increasing the carbonate content, thus simplifying the furnace operation and maintenance.

The fact that the process of our invention is carried out as an all solution process is very advantageous. In general, the preparation of pulp treating liquors, or chemicals for such liquors, requires the handling of inexpensive inorganic chemicals in tonnage qualities. Therefore, in the treatment of smelt, an all solution phase process eliminating the need for precipitation or crystallization of large amounts of product and the equipment for such operations is very desirable.

Even disregarding the economics, crystallization and precipitation processes present difficulties related to maintenance, to the plugging up of equipment and to the control necessary to deliver a filterable product of uniform quality free from impurities. Rotating equipment is generally required for such processes; the design, operation and maintenance of which is further complicated by the corrosive nature of the chemicals encountered.

On the other hand, our all solution phase process for treating smelt demands only simple liquid handling and contacting equipment (i. e., pipe lines, centrifugal pumps, packed or plate columns, etc.), and is readily adapted to continuous operation with automatic control.

As used in this specification, a "solution phase" process is defined to include any transient precipitates which may form but which can be handled in properly designed liquor processing equipment and which will redissolve during the process. Also, by "solution phase," we mean that the product being processed is in solution and that this does not preclude removal of relatively small amounts of insoluble impurities, dirt, etc. by filtration, sedimentation, etc.

As used herein, the term "flash-stripping" refers to the removal of hydrogen sulfide gas from solution by charging the hot solution while under pressure into a vacuum chamber in which the hydrogen sulfide and steam are flashed off, and the contacting of the solution with steam, preferably countercurrently, after the hydrogen sulfide has been flashed off to effect a further removal of hydrogen sulfide while under vacuum.

As used herein, the term "sulfidity" refers to that percentage of the total $Na_2O$ present which is present as $Na_2S$. By "high sulfidity" we mean a sulfidity which is higher than that desired for a pulping or refining operation.

In accordance with our invention we subject an aqueous smelt solution from a pulping operation to carbonation with carbon dioxide at a temperature of from 50° C. to 150° C. at a pressure of from 16 to 165 pounds per square inch absolute followed by flash-stripping under vacuum to remove and recover hydrogen sulfide. In one stage of carbonation and flash-stripping hydrogen sulfide cannot be completely eliminated and this is not necessary in some aspects of our invention. In those aspects of our invention where conversion of substantially all the sodium sulfide of the solution to salts of carbonic acid and where substantially complete hydrogen sulfide elimination is required, we subject the solution to multiple stages of carbonation and flash-stripping.

In its more complete aspects our process involves the use of the hydrogen sulfide either as such or after oxidation to sulfur dioxide for use in the preparation of acid digestion liquor.

While the exact nature of the reactions involved in our process is not completely understood, the following may serve as a possible explanation.

CARBONATION

The process of pressure carbonating hot solutions of sulfide containing smelt is believed to take place in two stages. First, the $CO_2$ is absorbed in the solutions, and second, the absorbed $CO_2$ reacts with the water to form carbonic acid. $CO_2$, as such, is absorbed to a limited extent in both hot and cold water and prior to its further reaction with the water is unreactive since it is not in ionic form. Heat is known to speed up the rate of reaction of $CO_2$ and water tremendously and also to increase the primary ionization of the carbonic acid thus formed to $HCO_3^-$ and $H^+$ ions. Heat also favors the secondary ionization of $HCO_3^-$ ions to $H^+$ and $CO_3^{--}$ ions, particularly in the presence of a proton acceptor such as $HS^-$. The reactions probably proceed as follows:

(1) $CO_2 + H_2O \rightleftarrows H_2CO_3 \rightleftarrows H^+ + HCO_3^-$
(2) $HCO_3^- \rightleftarrows H^+ + CO_3^{--}$
(3) $Na_2S + H_2CO_3 \rightleftarrows NaHS + NaHCO_3$
(4) $2NaHS + 2H^+ + CO_3^{--} \rightleftarrows Na_2CO_3 + 2H_2S$ (Ionically expressed $HS^- + H^+ \rightleftarrows H_2S$)
(5) $2NaHCO_3 \rightleftarrows Na_2CO_3 + CO_2 + H_2O$ All of the foregoing reactions tend to go to the right when a hot solution is carbonated and it is the reactive $H^+$ ions released that react with the $HS^-$ ions to form gaseous $H_2S$. This latter being relatively insoluble in the hot solution is readily removed by "flash-stripping" in a vacuum. Carbonation of a hot solution rather than cold tends to produce a higher concentration of the reactive $H^+$ ions (Equations 1 and 2) and renders the "flash-stripping" operation feasible.

The use of flue gas as the carbonating agent in a vented carbonation tower would result in considerable evolution of dilute $H_2S$ in the effluent gas if more than about 1.2 equivalents of $CO_2$ per equivalent of total titratable alkali were absorbed in the carbonation.

Even when using pure $CO_2$ in a substantially-closed chamber, there is a practical limit to the amount of carbon dioxide that can be added, in that the carbonation operation proceeds past the NaHS stage only with difficulty. As a result of the substantially-closed system and the increased driving force, however, this limit is somewhat higher than that reached when using flue gas.

When using pure $CO_2$ in a closed chamber, there would be no object in attempting to add $CO_2$ in amounts appreciably beyond that necessary to convert the $Na_2S$ to NaHS and all the $Na_2CO_3$ to $NaHCO_3$, since any such addition would result in undesirable dilution of the recovered $H_2S$ in the subsequent flash-stripping operation while still not achieving complete conversion in a single sequence of carbonation and flash-stripping.

FLASH-STRIPPING

The principal purpose of the flash-stripping operation is to remove sulfur from the solution as volatile $H_2S$ and to recover as much as possible of the $H_2S$ in a concentrated form. This causes the reaction equilibrium to shift toward completion as represented by the equation:

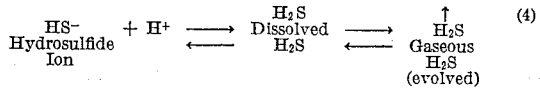

It would be expected that there would be an evolution of carbon dioxide (simultaneously with the $H_2S$) through decomposition of bicarbonate by the reaction:

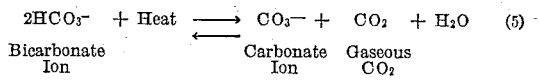

However, surprisingly, under the flash-stripping conditions of the invention, i. e., releasing the hot pressure carbonated solution into a vacuum, and then contacting it with steam at a lower temperature and pressure, very little bicarbonate decomposition occurs, with the result that the gas evolved is substantially hydrogen sulfide and water vapor. The latter may be readily condensed out leaving concentrated hydrogen sulfide. The flashing results in the removal of hydrogen sulfide and this reduces the acidity of the solution by the removal of hydrogen ions, concomitantly increasing the alkalinity and this condition permits the introduction of steam to effect stripping for a further elimination of hydrogen sulfide without loss of carbon dioxide.

One important feature of the invention is that the removal of hydrogen sulfide takes place while the solution is being cooled by the evaporation of water.

Irrespective of whether pure $CO_2$ or flue gas is used for the carbonation, no attempt is made to completely eliminate sulfide in flash-stripping when a single stage of carbonation and flash-stripping is used since as the stripping operation approaches completion, the efficiency of stripping with regard to steam consumption decreases tremendously.

Steam is used as the stripping agent since a recovery of concentrated hydrogen sulfide gas can be effected simply by condensing the steam from the effluent mixture of steam and hydrogen sulfide. Use of low pressure in flash-stripping as applied to this operation is an important technical feature of our invention. Reduced pressure markedly improves the conversion and apparently reduces carbon dioxide losses from bicarbonate decomposition.

In a preferred adaptation of our invention, the hot sulfide-containing solution is subjected to a carbonation treatment in which the solution is treated preferably in a counter-current manner, under pressure with a gas containing carbon dioxide. In this preferred method of operation the carbonation treatment is effected at a temperature of 50–150° C. with a gas pressure of 16–165 lbs. per square inch absolute, such that the mol ratio of carbon dioxide absorbed to total titratable alkali in the solution is in the range of 0.6 to 1.2. In that carbonation is carried out an elevated temperature and that sodium bicarbonate is converted to the more readily soluble carbonate by reaction of hydrogen ions with sodium hydrosulfide in the flash-stripping operation, relatively concentrated solutions of soda salts (e. g., of the order of 100 gm. per liter as $Na_2O$) may be treated without the formation of precipitates during processing.

By "total titratable alkali" in the above is meant the basicity equivalent to a standard acid titration to the methyl orange end point. In the case of sodium smelts this would include all of the sulfide, carbonate, and caustic soda, and one-half of the sulfite, and would exclude such salts as thiosulfate, sulfate, and chloride.

The carbonation and flash-stripping operations may be carried out in any type of equipment conventionally employed for gas absorption or stripping operations. Thus for the carbonation and flash-stripping we can use packed columns, plate columns, spray columns, and continuous liquid phase columns. Agitated gas dispersion equipment might be advantageously used for the carbonation stage.

The following table of experimental data illustrates a few of the advantages obtained through use of our invention:

Table I

| Source of $CO_2$ | Amount of $CO_2$ Used, Mol/Mol TTA | Avg. Conc. of $H_2S$ Evolved, Col. Percent | Smelt Solution Analysis (Percent $Na_2O$) | | | | | |
|---|---|---|---|---|---|---|---|---|
| | | | $Na_2S$ | $Na_2CO_3$ | $Na_2SO_4$ | $NaCl$ | $Na_2S_2O_3$ | $Na_2SO_3$ |
| Pure $CO_2$ | 1.02 | 94 | Before Treatment | | | | | |
| | | | 61.4 | 13.5 | 13.8 | 7.0 | 2.3 | 0.2 |
| | | | After Treatment | | | | | |
| | | | 19.1 | 55.9 | 15.6 | 7.0 | 2.4 | 0.0 |
| Flue Gas | 1.15 | 78 | Before Treatment | | | | | |
| | | | 61.4 | 13.5 | 13.8 | 7.0 | 2.3 | 0.2 |
| | | | After Treatment | | | | | |
| | | | 23.2 | 51.7 | 13.6 | 7.0 | 4.4 | 0.1 |

The carbon dioxide gas used in the carbonation process may be obtained from the best available source, as dictated by the economics of the process. We have obtained excellent results using pure carbon dioxide, such as can be purchased in cylinders or practically produced on a large scale by absorption-desorption processes using, for example, sodium carbonate or an alkanolamine absorbent.

Flue gas may be used to advantage, requiring only slightly higher operating pressures or larger equipment. Where a high degree of purity of the final product is desired, it may be advisable to purify the flue gas by removing suspended matter and scrubbing out any sulfur dioxide or other undesirable contaminant. Lime kiln gas if available may often be freed from suspended matter and used to advantage, since it will normally contain from 30% to 45% carbon dioxide.

When using diluted carbon dioxide (e. g., flue gas or lime kiln gas) in the pressure carbonation, counter-current flow is advantageously used. Under these conditions the gas leaving the top of the carbonator is in contact with highly alkaline solutions (i. e., smelt solution). Probably because of the high alkalinity at the point of gas exit, the amount of hydrogen sulfide leaving the top of the carbonator in dilute form is very low. As a result the preponderant portion of the total hydrogen sulfide produced is liberated in the flash-stripping operations in highly concentrated, readily usable form (see Table I).

Using pure carbon dioxide for carbonation, thiosulfate formation is negligible. Using diluted carbon dioxide containing oxygen (e. g., flue gas) some thiosulfate is formed but the amount is surprisingly low and the treated smelt solution is suitable for use in alkaline pulping. The small amount of thiosulfate formed by use of oxygen-containing flue gas in the solution carbonation process of our invention is in striking contrast to the very large amounts of thiosulfate produced when solid smelt is carbonated by flue gas.

An acid sulfite digestion liquor may be prepared by reaction of the sulfur dioxide with the soda ash or caustic soda used to provide the sodium make-up for losses in the cyclic pulping and recovery process. In such a pulping operation, however, it may be desirable to subject a portion of the smelt solution to treatment with an ion exchange resin for the adsorption of sodium. Such ion exchange treatment may be advantageously integrated with the carbonation process of the invention in the following manner.

Smelt produced by the combustion of the combined waste liquors is dissolved and the solution clarified. At least a portion of this smelt solution is passed through a weakly acidic ion exchange resin having in hydrogen form at least one type of exchange center selected from the class consisting of a corboxylic acid group or a phenolic hydroxyl group, so that sodium is adsorbed on the resin. The effluent from the resin treatment may be combined with any portion of the smelt solution not so treated and subjected to a carbonation treatment under pressure and at an elevated temperature according to the process of our invention whereby hydrogen sulfide is evolved in concentrated form and a smelt solution produced which has an enhanced content of sodium salts of carbonic acid and a decreased sulfur content.

In the ion exchange treatment hydrogen sulfide and carbon dioxide may be evolved. However, the relative amounts of solution and resin may be chosen such that volatile hydrogen sulfide and carbonic acid are not evolved but upon liberation immediately recombine with the excess of carbonate and sulfide of the smelt solution to form bicarbonate and bisulfide. The bicarbonate and bisulfide so formed facilitate carrying out the subsequent carbonation and stripping by lowering the pH and the hydrosulfide is decomposed to produce concentrated hydrogen sulfide.

The effluent from the treatment with the ion exchange resin, whether or not gaseous hydrogen sulfide or carbon dioxide are evolved, may, as outlined herein, be combined with a portion of the smelt solution not so treated and subjected to the carbonation and flash-stripping process of the invention.

The ion exchange resin containing adsorbed sodium may be treated with sulfurous acid to remove sodium and form a solution of sodium bisulfite and sulfurous acid suitable for use in the preparation of the acid digestion liquor.

The waste liquors may be obtained from a pulping sequence wherein lignocellulosic material is treated in one stage with an acidic sulfur containing material (e. g., sulfur dioxide, bisulfite, hydrogen sulfide, hydrosulfide) and in a succeeding stage with an alkaline solution. The waste liquors from these treatments, containing organic matter, sodium, and sulfur, are combined, evaporated to 45% to 75% total solids and burned in a smelting type furnace. This furnace may be similar to the conventional units now used in the kraft and soda mills throughout the industry. When operated under reducing conditions in the smelting zone, the furnace will generate steam and yield a "smelt" of fused soda salts. This smelt flows from the furnace and may, for example, be quenched or otherwise dissolved in water or some suitable effluent solution from the process to yield a characteristic "green liquor" containing essentially sodium sulfide and sodium carbonate, with smaller amounts of sodium sulfate, sodium thiosulfate and sodium sulfite. If logs which had been floated in the ocean are being treated there will be in addition an amount of sodium chloride. The green liquor is clarified in conventional clarification equipment and is pumped to a carbonation vessel where it comes in contact with carbon dioxide or a carbon dioxide containing gas. The optimum pressure is a function of the solution concentration, temperature, physical characteristics of the equipment, degree of carbonation required, etc., but preferably in the range of 20 to 165 pounds per square inch absolute. Carbonation temperature may be varied over a wide range but the higher temperatures favor the rate of chemical reaction and also the amount of flashing (release of hydrogen sulfide and water vapor) which occurs upon release of the pressure during transfer of the hot solution from the carbonation vessel to the flash-striper. We use a temperature in the range of 50° to 150° C., preferably in the range of 65° to 120° C.

The equipment for the solution carbonation process may be any conventional gas absorption apparatus, such as a packed column, a plate column, gas dispersion equipment with continuous liquid phase, or, in fact, the solution may be simply sprayed into a chamber containing the carbon dioxide gas under pressure. When using gases containing low concentrations of carbon dioxide, we have found the column type operation to be advantageous in that a countercurrent contact of the solution and the gas is achieved with the advantages associated with this type of operation.

The solution obtained from this carbonation treatment is introduced into another chamber maintained at a vacuum of from 5 to 29 inches of mercury and below the vapor pressure of water at the temperature of the carbonation, whereby a flash-stripping or sudden release of water vapor occurs accompanied by the simultaneous evolution of a portion of the hydrogen sulfide with only a relatively small proportion of carbon dioxide. In one manner of operation it has been found desirable to allow the flash-stripping to occur in the vapor space at the top of a column where a vacuum can be maintained, whereupon the remaining liquid passes down through this column, which may be a packed column, plate column, or similar equipment, in contact with ascending steam supplied to the base of the column. This effects the efficient removal of the hydrogen sulfide formed in the process.

It is advantageous to maintain a vacuum on the flash-stripping column of 15 to 29 inches of mercury; the efficiency of the column increasing rapidly with the increased vacuum. The commercial considerations involve an economic balance between the cost of steam and the cost of producing the highest possible vacuum.

The accompanying drawings illustrate by flow sheets operations embodying the invention and the following description is made with reference to these flow sheets.

The operations illustrated by reference to the flow sheets, particularly Fig. 1, start with water solutions of smelts from pulping operations as previously described and contain sodium sulfide together with other chemicals such as sodium carbonate. Such smelts may be derived from the evaporation and burning of alkaline waste liquors or from combined acid and alkaline digestion waste liquors.

In an operation carried out as illustrated in the flow sheet of Fig. 1, waste effluent from a treatment with a liquor containing sodium sulfite is subjected to evaporation and then to furnacing to produce a smelt containing a substantial proportion of sodium sulfide. This smelt, which is now a high sulfidity smelt, is dissolved in water to form a smelt solution containing sodium sulfide and sodium carbonate.

The solution is divided into two parts. One part is subjected to a plurality of carbonation treatments each of which is followed by flash-stripping in accordance with the process of this invention for the purpose of substantially eliminating sodium sulfide and enhancement of sodium carbonate content of the solution. Hydrogen sulfide is released and is recoverable in concentrated form. The resulting effluent solution is then treated with sulfur dioxide, preferably obtained by burning the hydrogen sulfide, resulting in the liberation of carbon dioxide and the formation of sodium sulfite.

The other portion of the smelt solution is subjected to a single-stage of carbonation and flash-stripping according to the invention for the elimination of a part of the hydrogen sulfide and the reduction of the sodium sulfide content and an enhancement of the sodium carbonate. The resulting effluent solution can be combined with the sodium sulfite containing liquor to form an alkaline treating liquor containing sodium sulfite for return to the pulping operation.

In both operations involving the carbonation and flash-stripping hydrogen sulfide is recovered in concentrated form and can be used in any suitable way, for example, by oxidation to form sulfur dioxide for use in forming sodium sulfite.

The operation carried out as illustrated by the flow sheet of Fig. 2 is directed to the treatment of smelt solution of high sulfidity containing sodium sulfide and sodium carbonate as in the flow sheet of Fig. 1.

This aqueous smelt solution is divided into two parts, one part being passed into adsorption contact with a suitable weakly acidic cation exchange resin in hydrogen form such as resins containing carboxylic acid groups or those containing phenolic hydroxyl groups whereby sodium is adsorbed. In the ion exchange treatment hydrogen sulfide and carbon dioxide may be evolved. The ion exchange resin containing adsorbed sodium may be treated with sulfurous acid to remove sodium and form a solution of sodium bisulfite and sulfurous acid suitable for use in the preparation of acid digestion liquor.

The other portion of the smelt solution is subjected to a single-stage of carbonation and flash-stripping according to the invention to release hydrogen sulfide and produce a solution having a reduced sodium sulfide content and an enhanced sodium carbonate content. The effluent solution from this treatment may be combined with the solution from the ion exchange treatment containing sodium bisulfite either as such or after stripping to remove free $SO_2$, to form an alkaline treating liquor.

As an alternative operation the process illustrated in Fig. 2 may be modified by directing the effluent liquor from the ion exchange treatment which has a diminished sodium content into that portion of the liquor which is subjected to the carbonation and flash-stripping. This mixing of the liquors results in a solution having lower alkalinity and as a consequence the carbonation may be carried out with a smaller quantity of carbon dioxide to effect carbonation.

In that the ion exchange treatment results in the release of hydrogen sulfide in less concentrated form than in flash-stripping, the gas being diluted with an appreciable amount of carbon dioxide, these gases may advantageously be used as the carbonating gas. In this manner the carbon dioxide is utilized and the hydrogen sulfide is recovered in subsequent flash-stripping at a concentration substantially higher than that of the gas evolved from the ion exchange treatment.

An operation carried out in accordance with the process illustrated in the flow sheet of Fig. 3 is directed to the treatment of a smelt solution containing sodium sulfide and sodium carbonate as in the process illustrated in Fig. 1. This smelt solution is subjected to a single-stage of carbonation and flash-stripping according to the invention resulting in the evolution of hydrogen sulfide in concentrated form and an aqueous solution having a materially reduced sodium sulfide content and an enhanced sodium carbonate content. The effluent solution from this treatment is divided into two parts, one part is subjected to an additional stage of carbonation followed by flash-stripping for the removal of an additional quantity of hydrogen sulfide resulting in the substantial elimination of sodium sulfide and a material increase in the sodium carbonate content. The effluent solution from this second carbonation and flash-stripping operation is reacted with sulfur dioxide to form a solution containing sodium sulfite. This solution is combined with the other part of the solution from the first carbonation and flash-stripping to form an alkaline treating liquor containing sodium sulfite, sodium sulfide, and sodium carbonate. Optionally this solution prior to combination with sodium sulfite may be subjected to causticization with lime to form a solution containing sodium hydroxide for use in forming alkaline cooking liquor.

The operation illustrated by the flow sheet of Fig. 4 comprises the treatment of an aqueous smelt solution of high sulfidity containing sodium sulfide and sodium carbonate derived from any wood pulping or refining operations. This solution is subjected to a single-stage carbonation and flash-stripping to release hydrogen sulfide in concentrated form and to diminish the sodium sulfide content of the solution and increase the sodium carbonate content. The effluent solution is divided into two parts, one part being subjected to a further stage of carbonation followed by flash-stripping to release additional hydrogen sulfide in concentrated form and to substantially eliminate the sodium sulfide, also enhancing the sodium carbonate content.

The effluent liquor from the second carbonation and flash-stripping is reacted with sulfur dioxide to form an acid sulfite digestion liquor containing sodium bisulfite and sulfurous acid.

The other portion of the smelt solution containing sodium sulfide and sodium carbonate is subjected to causticization with lime (CaO) to form an alkaline digestion liquor of reduced sulfidity containing sodium sulfide and sodium hydroxide. By reason of the composition of this liquor it is particularly suitable for kraft digestion.

The hydrogen sulfide released in these flash-stripping operations is preferably combined and burned with oxygen to form sulfur dioxide for use in the operation.

The processes of the invention illustrated by the flow sheet of Fig. 5 comprises the treatment of a smelt solution containing sodium sulfide and sodium carbonate derived from any suitable source as previously described. This aqueous solution is divided into two parts, one part being subjected to a plurality of carbonation treatments each of which is followed by flash-stripping in accordance with the invention for the removal of hydrogen sulfide in concentrated form and the substantial elimination of the sodium sulfide and the enhancement of the sodium carbonate. The effluent liquor from these treatments is reacted with sulfur dioxide to form sodium sulfite or an acid digestion liquor containing sodium bisulfite and sulfurous acid. The other part of the smelt solution which contains sodium sulfide and sodium carbonate can be used as an alkaline treating liquor or combined with the sodium bisulfite containing liquor prepared by ion exchange treatment of a portion of the smelt as illustrated in Fig. 2 for use as an alkaline treating liquor.

When carrying out a single-stage of carbonation and stripping the mol ratio of carbon dioxide absorbed to total titratable alkali should be in the range of 0.6 to 1.2. Depending upon the conditions used in the carbonation, up to 80% of the sulfide content may be eliminated. In many cases a reduction considerably less than 80% will give a solution having the desired sulfidity for alkaline digestion. The product solution may be used as such for alkaline digestion liquor or it may be reacted with lime to convert the carbonate content of the solution to sodium hydroxide. Sodium sulfite may be added to the final liquor or in the case of causticization it may be added either before or after the addition of lime. When a plurality of carbonation treatments, each of which is followed by flash-stripping, are used, the second carbonation is carried out such that the mol ratio of carbon dioxide absorbed to total titratable alkali is in the ratio of 0.3 to 0.7. The flash-stripping following this carbonation results in the substantial elimination of sodium sulfide and the removal of practically all of the hydrogen sulfide resulting in a solution of materially increased sodium carbonate content.

The hydrogen sulfide released from the flash-stripping will initially be intermixed with some steam which may be condensed out, resulting in the recovery of hydrogen sulfide of high concentration. This hydrogen sulfide may be oxidized in a burner to form sulfur dioxide which can be used in the process.

We claim:

1. In the preparation of wood pulp, the solution-phase process for recovering chemicals and preparing pulp digestion liquors which comprises combusting soda-base waste liquor containing sulfur compounds from the digestion of wood, forming a smelt containing a substantial quantity of sodium sulfide by furnacing the waste liquor under reducing conditions and forming an aqueous solution of the resulting smelt, subjecting one body of the smelt solution to carbonation with a gas consisting at least in part of carbon dioxide under a pressure of from 16 to 165 pounds per square inch absolute and at a temperature of from 50° to 150° C., directing the hot carbonated solution while under pressure into a chamber maintained under a vacuum of from 5 to 29 inches of mercury where hydrogen sulfide and steam flash off releasing a substantial proportion of the hydrogen sulfide and then contacting the solution with steam to strip off additional hydrogen sulfide while under the vacuum, whereby hydrogen sulfide is recovered in concentrated form and a smelt solution is produced having an enhanced content of salts of carbonic acid and a decreased sulfide content, causticizing with lime the solution having an enhanced content of salts of carbonic acid and a decreased sulfide content to form an alkaline liquor containing sodium sulfide and sodium hydroxide, subjecting another part of the smelt solution to multiple stages of solution carbonation each followed by flash-stripping as aforementioned for the substantially complete removal of hydrogen sulfide thereby substantially completely removing the sodium sulfide therefrom and enhancing the content of sodium salts of carbonic acid, reacting sulfur dioxide with said latter solution to form sodium sulfite and sodium bisulfite, and combining the causticized solution with the solution containing sodium sulfite and sodium bisulfite.

2. In the preparation of wood pulp, the solution-phase process for recovering chemicals and preparing pulp digestion liquors which comprises combusting soda-base waste liquor containing sulfur compounds from the digestion of wood, forming a smelt containing a substantial quantity of sodium sulfide by furnacing the waste liquor under reducing conditions and forming an aqueous solution of the resulting smelt, subjecting one part of the smelt solution to carbonation with a gas consisting at least in part of carbon dioxide under a pressure of from 16 to 165 pounds per square inch absolute and at a temperature of from 50° to 150° C., directing the hot carbonated solution while under pressure into a chamber maintained under a vacuum of from 5 to 29 inches of mercury where hydrogen sulfide and steam flash off releasing a substantial proportion of the hydrogen sulfide and then contacting the solution with steam to strip off additional hydrogen sulfide while under the vacuum, whereby hydrogen sulfide is recovered in concentrated form and a smelt solution is produced having an enhanced content of salts of carbonic acid and a decreased sulfide content, combining the solution having an enhanced content of salts of carbonic acid and a decreased sulfide content with the other part of the smelt solution.

3. In the preparation of wood pulp, the solution-phase process for recovering chemicals and preparing pulp digestion liquors which comprises combusting soda-base waste liquor containing sulfur compounds from the digestion of wood, forming a smelt containing a substantial quantity of sodium sulfide by furnacing the waste liquor under reducing conditions and forming an aqueous solution of the resulting smelt, subjecting one part of the smelt solution to carbonation with a gas consisting at least in part of carbon dioxide under a pressure of from 16 to 165 pounds per square inch absolute and at a temperature of from 50° to 150° C., directing the hot carbonated solution while under pressure into a chamber maintained under a vacuum of from 5 to 29 inches of mercury where hydrogen sulfide and steam flash off releasing a substantial proportion of the hydrogen sulfide and then contacting the solution with steam to strip off additional hydrogen sulfide while under the vacuum, whereby hydrogen sulfide is recovered in concentrated form and a smelt solution is produced having an enhanced content of salts of carbonic acid and a decreased sulfide content, passing the other part of the smelt solution in contact with an ion exchange resin to adsorb sodium, and passing the solution from which sodium was adsorbed into the first-mentioned part of smelt solution prior to carbonation to decrease the alkalinity and thus reduce the amount of carbon dioxide required for carbonation.

4. In the preparation of wood pulp, the solution-phase process for recovering chemicals and preparing pulp digestion liquors which comprises combining acid sulfite waste liquor from the prehydrolysis of wood pulp with alkaline waste liquor from the digestion of the prehydrolyzed wood pulp, combusting the combined waste liquor containing sulfur compounds, forming a smelt containing a substantial quantity of sodium sulfide by furnacing the waste liquor under reducing conditions and forming an aqueous solution of the resulting smelt, subjecting the smelt solution to carbonation with a gas consisting at least in part of carbon dioxide under a pressure of from 16 to 165 pounds per square inch absolute and at a temperature of from 50° to 150° C., directing the hot carbonated solution while under pressure into a chamber maintained under a vacuum of from 5 to 29 inches of mercury where hydrogen sulfide and steam flash off releasing a substantial proportion of the hydrogen sulfide and then contacting the solution with steam to strip off additional hydrogen sulfide while under the vacuum, whereby hydrogen sulfide is recovered in concentrated form and a smelt solution is produced having an enhanced content of salts of carbonic acid and a decreased sulfide content, subjecting one part of the solution of decreased sulfide content to causticization with lime (CaO) to form an alkaline digestion liquor containing sodium sulfide and sodium hydroxide, returning the alkaline digestion liquor thus formed to the alkaline digestion, subjecting another part of the solution of decreased sulfide content to further carbonation and flash-stripping as aforementioned to effect a substantially complete elimination of sodium sulfide and an enhanced content of sodium carbonate, sulfiting the solution of chemicals from the last mentioned flash-stripping containing an enhanced content of sodium carbonate to form an acid sulfite digestion liquor, and returning the acid sulfite digestion liquor to the acid sulfite prehydrolysis.

5. In the preparation of wood pulp, the solution-phase process for recovering chemicals and preparing pulp digestion liquors which comprises combusting waste liquors from successive digestions of wood with (1) an acid solution selected from a group consisting of sulfurous acid and a mixture of sodium bisulfite and sulfurous acid and (2) an alkaline solution to yield a smelt containing sodium sulfide, passing at least a portion of the smelt solution through an ion exchange resin having at least one of the types of exchange centers selected from the group consisting of carboxylic acid and phenolic hydroxyl groups so that sodium is adsorbed on the resin, and combining the effluent from the resin treatment from which sodium was adsorbed with that portion of the smelt solution not treated and subjecting the resulting solution to a carbonation treatment under a pressure of from 20 to 165 pounds per square inch absolute and at a temperature of from 50° to 150° C. with a gas consisting at least in part of carbon dioxide, the carbonation treatment being followed by flash-stripping under vacuum of from 5 to 29 inches of mercury, whereby hydrogen sulfide is recovered in concentrated form and a smelt solution is produced having an enhanced content of sodium salts of carbonic acid and a decreased sulfur content.

6. In the preparation of wood pulp, the process for preparing an alkaline digestion liquor containing sodium sulfite which comprises combusting waste liquor from an alkaline digestion of wood to produce a smelt containing sodium sulfide, subjecting a solution of said smelt to a carbonation treatment under a pressure of from 20 to 165 pounds per square inch absolute and at a temperature of from 50° to 150° C. with a gas consisting at least in part of carbon dioxide, the carbonation treatment being followed by flash-stripping under a vacuum of from 5 to 29 inches of mercury, subjecting a first portion of the product solution formed by flash-stripping to a second carbonation treatment under pressure and at an elevated temperature, the second carbonation treatment being followed by a second flash-stripping treatment under vacuum to produce a solution having an enhanced content of sodium salts of carbonic acid and substantially free of sodium sulfide, and treating at least a portion of said sulfide free solution at an elevated temperature with sulfur dioxide to produce neutral sodium sulfite, subjecting a second portion of the solution of the first flash-stripping to causticizing with lime, adding at least a portion of said neutral sodium sulfite to the second portion of the product from the first flash-stripping operation which has been subjected to causticizing whereby an alkaline digestion liquor is produced of controlled sulfidity and containing sodium sulfite.

7. In the preparation of wood pulp, the process for preparing an alkaline digestion liquor which comprises combusting waste liquor from an alkaline digestion of wood and producing a smelt therefrom containing sodium sulfide, forming a water solution of said smelt, treating one portion of said smelt solution with a cation exchange resin having active exchange centers which are substantially weakly acidic groups in hydrogen form to adsorb sodium on the resin, treating said resin containing adsorbed sodium with sulfurous acid to form a solution containing sodium bisulfite, subjecting another portion of said smelt in solution to a carbonation treatment under a pressure of from 20 to 165 pounds per square inch absolute and at a temperature of from 50° to 150° C. with a gas consisting at least in part of carbon dioxide, the carbonation treatment being followed by flash-stripping under a vacuum of from 5 to 29 inches of mercury to release hydrogen sulfide and form a solution of decreased sulfidity, causticizing said liquor of decreased sulfidity with lime to form a liquor containing sodium sulfide and sodium hydroxide, and adding said solution of sodium bisulfite to said causticized liquor, whereby an alkaline digestion liquor is produced of controlled sulfidity and containing sodium sulfite.

References Cited in the file of this patent

UNITED STATES PATENTS

| 2,675,297 | Grey et al. | Apr. 13, 1954 |
| 2,710,254 | Van Blaricom et al. | June 7, 1956 |

FOREIGN PATENTS

| 87,098 | Sweden | Aug. 11, 1936 |
| 90,130 | Sweden | Aug. 31, 1937 |